United States Patent
Rai et al.

(10) Patent No.: US 9,983,985 B2
(45) Date of Patent: May 29, 2018

(54) SYSTEM AND METHOD FOR SOFTWARE UPGRADE ANALYSIS

(71) Applicant: SAP SE, Walldorf (DE)

(72) Inventors: Anup Kumar Rai, Bengaluru (IN); Suchit Mathur, Bengaluru (IN); Ashwini Deshpande, Bengaluru (IN)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 14/860,088

(22) Filed: Sep. 21, 2015

(65) Prior Publication Data

US 2017/0039133 A1    Feb. 9, 2017

(30) Foreign Application Priority Data

Aug. 6, 2015 (IN) .......................... 4103/CHE/2015

(51) Int. Cl.
  G06F 9/45     (2006.01)
  G06F 11/36    (2006.01)
  G06F 9/44     (2018.01)
  G06F 9/445    (2018.01)

(52) U.S. Cl.
  CPC ............ G06F 11/3688 (2013.01); G06F 8/65 (2013.01); G06F 8/70 (2013.01); G06F 11/3692 (2013.01)

(58) Field of Classification Search
  CPC ........... G06F 11/3688; G06F 8/65; G06F 8/70
  See application file for complete search history.

(56) References Cited

U.S. PATENT DOCUMENTS

| | | |
|---|---|---|
| 7,266,819 B2 | 9/2007 | Helgesen et al. |
| 7,290,257 B2 | 10/2007 | Henig et al. |
| 7,653,902 B2 | 1/2010 | Bozak et al. |
| 7,761,865 B2 | 7/2010 | Stienhans et al. |
| 7,908,589 B2 | 3/2011 | Sattler et al. |
| 8,201,162 B2 | 6/2012 | Okachi et al. |
| 8,234,485 B2 | 7/2012 | Wu |
| 8,255,899 B2 | 8/2012 | Halliday |
| 8,392,908 B2 | 3/2013 | Laicher et al. |

(Continued)

OTHER PUBLICATIONS

Levent Yilmaz and David Kent, ACART: An API Compliance and Analysis Report Tool for Discovering Reference Design Traceability, ACM, 2011, retrieved on Dec. 19, 2017, pp. 243-248. Retrieved from the Internet: <URL: http://delivery.acm.org/10.1145/2020000/2016103/p243-yilmaz.pdf?>.*

*Primary Examiner* — Hanh T Bui

(74) *Attorney, Agent, or Firm* — Klarquist Sparkman, LLP

(57) ABSTRACT

A method, implemented at least in part by a computing device, for software upgrade analysis includes receiving a selection of at least one object class of a plurality of available object classes. One or more application programming interface (API) calls may be retrieved from a plurality of API calls based on the received selection. A test definition may be generated based at least in part on the one or more API calls. A first test may be executed by using the one or more API calls in the test definition within a software environment. The first test is run on the software environment prior to upgrading the environment. Subsequent to upgrading the environment, a second test is executed by using the one or more API calls within the upgraded software environment. A software upgrade report is generated based on a comparison of test results from the first and second tests.

16 Claims, 11 Drawing Sheets

(56) References Cited

U.S. PATENT DOCUMENTS

| | | |
|---|---|---|
| 8,434,066 B2 | 4/2013 | Sharma |
| 8,458,690 B2 | 6/2013 | Zhang et al. |
| 8,621,453 B2 | 12/2013 | Wookey |
| 8,661,432 B2 | 2/2014 | Kriebel et al. |
| 2007/0256067 A1* | 11/2007 | Chahal ...................... G06F 8/63 717/168 |
| 2009/0125891 A1* | 5/2009 | Garimella ........... G06F 11/3688 717/131 |
| 2011/0010644 A1* | 1/2011 | Merrill ...................... G06F 8/34 715/762 |
| 2012/0030658 A1* | 2/2012 | Hu ...................... G06F 11/3688 717/131 |
| 2014/0068584 A1 | 3/2014 | Lim et al. |

\* cited by examiner

400 — The Test Suite.XML Structure

```
<TestSuite>
    <TestCase>
402         <Name>{CUID+objectName+Optype+[args]}</Name> -- A unique Name
            <ArtifactType>Webi</ArtifactType>
            <OpName>Open</Opname>
            <args>
                <Cuid>ox7Hnbsnsjsj<Cuid>
            </args>
    </TestCase>
    <TestCase>
404         <Name>{CUID+objectName+Optype+[args]}</Name> -- A unique Name
            <ArtifactType>Webi</ArtifactType>
            <OpName>Refresh</Opname>
            <args>
                <Cuid>ox7Hnbsnsjsj<Cuid>
            </args>
    </TestCase>
    <TestCase>
406         <Name>{CUID+objectName+Optype+[args]}</Name> -- A unique Name
            <ArtifactType>Crystal</ArtifactType>
            <OpName>Open</Opname>
            <args>
                <Cuid>ox7Hnbsnsjsj<Cuid>
            </args>
    </TestCase>
    <TestCase>
408         <Name>{CUID+objectName+Optype+[args]}</Name> -- A unique Name
            <ArtifactType>Universe</ArtifactType>
            <OpName>Open</Opname>
            <args>
                <Cuid>ox7Hnbsnsjsj<Cuid>
            </args>
    </TestCase>
</TestSuite>
```

FIG. 4

SYSTEM AND METHOD FOR SOFTWARE UPGRADE ANALYSIS

CROSS REFERENCE TO RELATED APPLICATION

Applicant claims the benefit under 35 U.S.C. § 119 of the earlier filing date of foreign application No. 4103/CHE/2015, filed on Aug. 6, 2015 in India. The entire disclosure of foreign application No. 4103/CHE/2015 is considered to be part of the disclosure of the accompanying (present) application, and is incorporated herein by reference in its entirety.

BACKGROUND

As enterprises accumulate ever-greater amounts of data on their transactions, processes, products, and operations, online analytical processing using various enterprise software solutions has become an important part of doing business. The number of tools and techniques addressing analytical processing has grown, enabling data analysts to quickly analyze and navigate through vast and complex collections of data using processing software and platforms. In a computing environment with many computing devices, such as a network environment (e.g., a cloud computing environment or other network environments) with many server computers, the use of computing resources, including installed software resources, can provide a number of advantages including cost advantages and/or the ability to adapt rapidly to changing computing resource needs.

Upgrading the current version of software with a newer version is an inevitable exercise for customers as it provides fixes for known bugs and also gives newer powerful and useful features. Software upgrades can be provided in different intervals. Even though customers may be interested to try out and upgrade to newer versions of the software, there is no way for them to know if applying these upgrades wont damage the stability of their existing computing systems. While every patch or feature pack of a software upgrade goes through thorough regression testing in the development environment, a given software patch or upgrade could still fail in a customer software enterprise environment because deployments in the customer environment are complex, diverse and sometimes it is difficult to visualize the way, in which products could be used/deployed in a specific software environment.

However, validating software upgrades is time consuming, may delay the adoption of the upgrade, and therefore, may hinder implementation of essential functionalities provided by the upgrade. Therefore, there is a need for enabling software upgrades by providing a reliable and efficient solution to the customer to analyze and validate the software upgrade.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, a method, implemented at least in part by a computing device, for software upgrade analysis is disclosed. The method may include receiving by the computing device, a selection of at least one object class of a plurality of available object classes. One or more application programming interface (API) calls may be retrieved from a plurality of API calls based on the received selection. A test definition may be generated based at least in part on the one or more API calls. A first test may be executed by using the one or more API calls in the test definition within a software environment. The first test is run on the software environment prior to upgrading the software environment. Subsequent to upgrading the software environment, a second test is executed by using the one or more API calls of the test definition within the upgraded software environment. A software upgrade report is generated based on a comparison of test results from the first test and test results from the second test.

In another aspect of the disclosure, a computer-readable storage medium is disclosed and may include instructions for software upgrade analysis. The method may include receiving a selection of an object class and a plurality of operations that can be performed on documents of the object class. The plurality of operations are associated with a corresponding plurality of API calls for triggering the operations. One or more arguments may be selected for each of the plurality of operations. A plurality of test cases are generated, where each test case includes information identifying the object class, one of the plurality of operations and the one or more arguments. A test definition file comprising the plurality of test cases is generated. A plurality of tests are executed in a software environment using the test definition file, to generate a plurality of test results. At least one of the plurality of tests is executed after the software environment is upgraded. At least two of the plurality of test results can be compared on an API-by-API basis, to generate a software upgrade report.

In yet another aspect of the disclosure, a computing device is disclosed which includes a first repository storing a plurality of available object classes; a second repository storing a plurality of test cases, each test case comprising at least one of a plurality of operations available for performing on a document associated with at least one of the plurality of object classes; a memory; and a processor coupled to the first repository, the second repository and the memory. The processor is adapted to perform a method for software upgrade analysis. The method includes receiving a selection of an object class from the plurality of available object classes within the first repository. A selection is received of one or more test cases from the plurality of test cases within the second repository. A test definition file including the selected one or more test cases is generated. A first test is executed by using at least one API call to perform the at least one of the plurality of operations in each of the one or more test cases within a software environment. The first test is run on the software environment prior to upgrading the software environment. Subsequent to upgrading the software environment, a second test is executed by using the at least one API call to perform the at least one of the plurality of operations within the upgraded software environment. A software upgrade report is generated based on a comparison of test results from the first test and test results from the second test, the comparison being performed on an API-by-API basis.

As described herein, a variety of other features and advantages can be incorporated into the technologies as desired.

BRIEF DESCRIPTION OF THE DRAWINGS

FIG. 4 illustrates example test suite definition structure, in accordance with an example embodiment of the disclosure.

DETAILED DESCRIPTION

Figure 1:
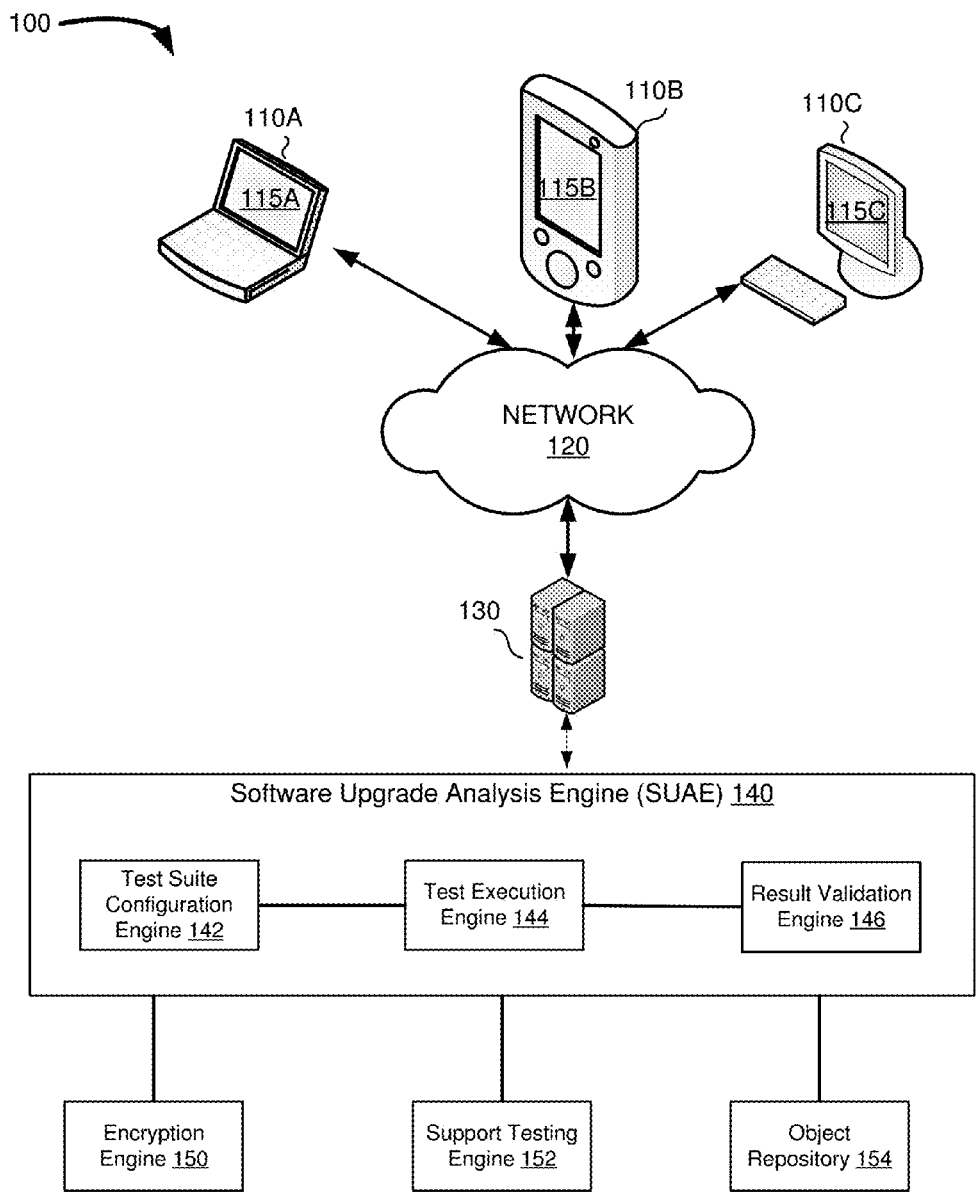
FIG. 1 is a block diagram of an exemplary system using a software upgrade analysis engine, in accordance with an embodiment of the disclosure.

The technologies described herein can be used in an application code development and testing environment, where software can be tested at multiple stages of a software upgrade process, and then an analysis may be performed and a report generated based on a comparison of the test results. More specifically, a software upgrade analysis engine (SUAE) may be used to initially configure a test suite (e.g., using a test suite configuration engine) based on one or more of a selected object type, at least one document of the object type, and a test selection. The test selection may include selecting one or more operations to be performed on the at least one document, as well as one or more arguments that may be used for performing the operations. In some instances, an external test suite may be used as well. A test execution engine within the SUAE may generate a test suite definition (e.g., a test suite definition file) with one or more test cases, where each test case may correspond to a given operation from the selected operations. The operations in each test call may be converted to API calls, which may be used for executing the corresponding operation. The test suite definition may be used for executing a test prior to a software upgrade and after a software upgrade. A result validation engine within the SUAE may compare the test results on an API-by-API basis to generate a final analysis report (e.g., each result from executing an API call for a test case is compared with a result from executing the same API call for the same test case but after the software upgrade). If the API call execution results match, a PASS indication may be included in the final analysis report (a FAIL indication is included otherwise). In this regard, the SUAE can be used to automatically compare the state of the system before and after a software upgrade, providing a report which indicates the status of execution and a comparison between tests. Based on the final report, a user may decide to either proceed with the software upgrade or address any FAIL issues indicated in the final report.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive- or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

As used herein, the term "application program" (sometimes shortened to application) can refer to any program designed to perform a specific function directly for the user or, in some cases, for another application program. Examples of application programs include word processors; database programs; Web browsers; network administration tools; development tools; drawing, paint, and image editing programs; and communication programs. Application programs use the services of the computer's operating system and other supporting programs.

As used herein, the terms "data" or "information content" can include analytics data, such as created analytics reports, analytics, or other artifacts created by enterprise database suites (e.g., SAP's Crystal Reports, Lumira Datasets, WEBI reports, XCelcius reports, etc.). The data or information content can also be other, arbitrary content such as spreadsheets, images, documents in a document flow, user interfaces, web services, or the like.

Figure 2:
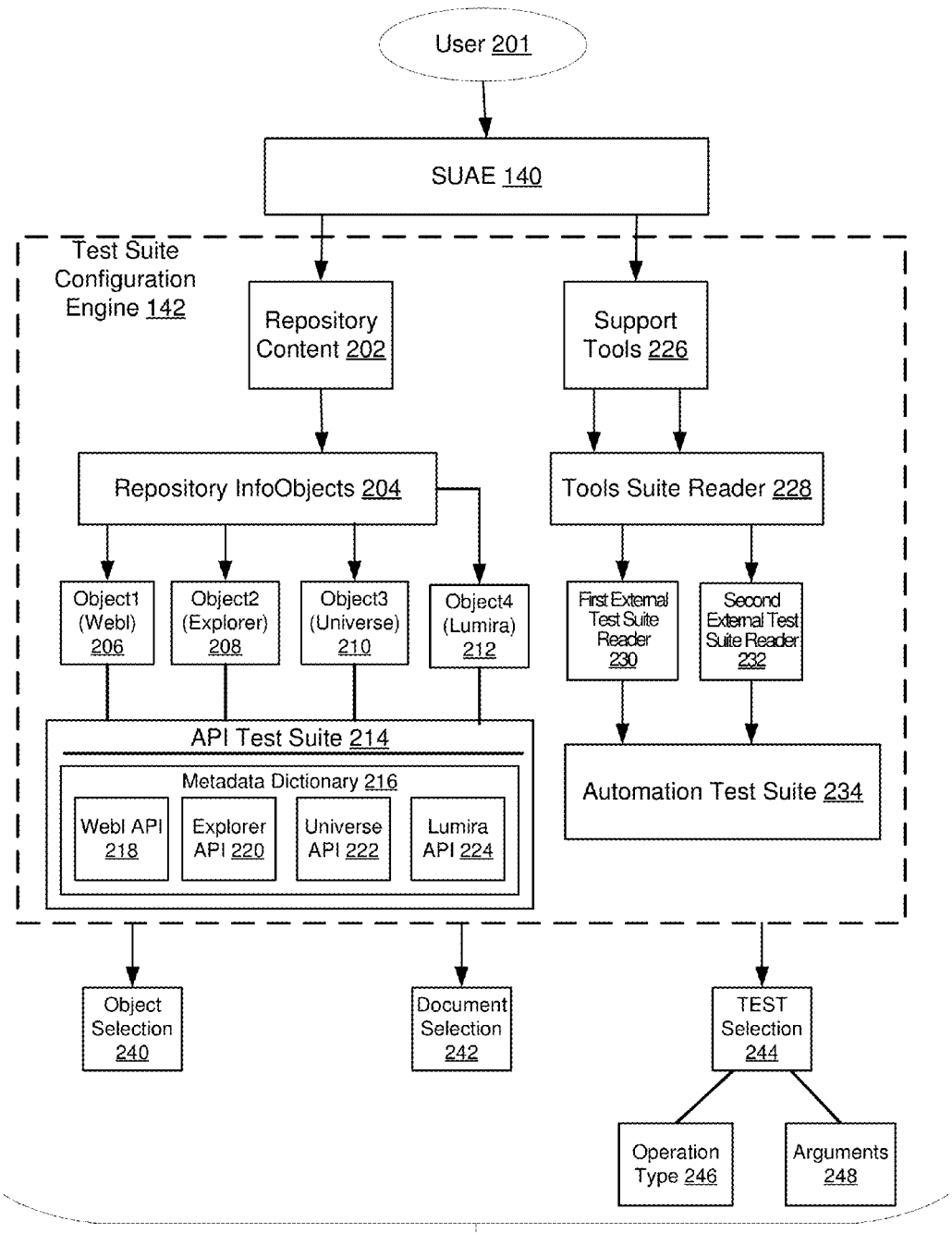
FIG. 2 is a block diagram of a test suite configuration engine used by the software upgrade analysis engine of FIG. 1, in accordance with an example embodiment of the disclosure.

As used herein, the term "object" (or "business object" or "object class") may represent real-world items used during the transaction of business, such as documents (e.g., a sales order, a purchase order, an invoice, etc.), a product, a partner company, a piece of equipment, and so forth. A business object may include business logic and/or data having any suitable structure, which may be based on the requirements of the business scenario in which the business object is to be used. For example, a business object (or a user interface for rendering data for business objects, or a web service for accessing data for business objects) may include a plurality of attributes (or data), where the attributes may be associated with access paths to the locations (e.g., database locations) storing the attributes' data. Each attribute may be associated with one or more backend data processing services used for querying, retrieving and manipulating the data. As used herein, the terms "object" and "object model" are interchangeable. An example business object and associated attributes is illustrated in FIG. 2.

As used herein, the term "metadata" means data about other data, and the term "analytics metadata" can include metadata associated with information content, as well as metadata associated with one or more locations hosting the information content. For example, for a given analytics report, the "analytics metadata" may include metadata associated with the report itself (e.g., title, author, date of creation, report fields, report columns, linked information sources, and the like), as well as metadata associated with the database connection for the analytics report (e.g., metadata associated with a database, a database query and/or a data cube used for accessing or hosting the analytics report). Additionally, analytics metadata for one category of database connections (e.g., a database) may be associated (e.g., linked) to analytics metadata associated with another database connection category (e.g., a query and/or a cube), and/or to analytics metadata associated with information content that is accessible via the database connection. Furthermore, analytics metadata may include information for one or more attributes (or data) associated with a meta-object model as well as the access path (e.g., location to a node, a database or another data location) for accessing data associated with the attribute.

FIG. 1 is a block diagram of an exemplary system 100 using a software upgrade analysis engine 140, in accordance with an embodiment of the disclosure. In the example, any number of client computing devices 110A-C present user interfaces 115A-C, by which the devices 110A-C can interact with at least one server device 130 via a network 120 to perform or utilize the described technologies. A server 130 can offer access to the software upgrade analysis engine (SUAE) 140. The SUAE 140 may access one or more additional functionalities and/or data provided by the encryption engine 150, the support testing engine 152, and/or the object repository 154.

Each of the computing devices 110 can be a smart phone or other wireless phone, a laptop or netbook computer, a tablet or notepad computer, a wearable computer, a mobile station, an entertainment appliance, an audio and/or video playback device, a game console, an automotive computer, and so forth. Each of the computing devices 110 can also be referred to as being a mobile device because the device 110 may be designed or intended to be moved to multiple different locations (e.g., taken by a user with him or her as the user goes to different locations).

In practice, the functionalities of the SUAE 140 can be invoked by activating a user interface (UI) (e.g., 115A-115C) for selecting a software environment (e.g., software installed on any of the client devices 110 or the server 130), and performing the test suite configuration, test execution and result validation functions described herein in connection with the SUAE 140. In this regard, software upgrade analysis may be initiated by, and analysis results may be displayed at, any of the computing devices 110.

The SUAE 140 may comprise suitable circuitry, interfaces, logic and/or code and may be operable to perform software upgrade analysis as described herein. More specifically, the SUAE 140 may comprise the encryption engine 150, the support testing engine 152, and the object repository 154. The encryption engine 150 may comprise suitable circuitry, interfaces, logic and/or code and may be used for configuring a test suite based on one or more of a selected object type (e.g., selected from the object repository 154), at least one document of the object type, and a test selection. The test selection may include selecting one or more operations to be performed on the at least one document, as well as one or more arguments that may be used for performing the operations. In some instances, an external test suite may be used as well (e.g., as provided by the support testing engine 152).

The test execution engine 144 may comprise suitable circuitry, interfaces, logic and/or code and may be configured to generate a test suite definition for the test suite configured by the engine 142 (e.g., a test suite definition file) with one or more test cases configured using information provided by the test suite configuration engine 142. Each test case may correspond to a given operation from the one or more operations selected using engine 142. The operations in each test call may be converted to API calls, which may be used for executing the corresponding operation. The test suite definition may be used for executing a test by the test execution engine 144 prior to a software upgrade and after a software upgrade. In an example embodiment, the test suite definition file may be generated by the configuration engine 142 and passed onto the test execution engine 144 for execution of the tests.

The result validation engine 146 may comprise suitable circuitry, interfaces, logic and/or code and may be operable to compare the test results (e.g., obtained by the test execution engine 144 after executing a plurality of tests using the test suite definition) on an API-by-API basis to generate a final analysis report (e.g., each result from executing an API call for a test case is compared with a result from executing the same API call for the same test case but after the software upgrade). If the API call execution results match, a PASS indication may be included in the final analysis report (a FAIL indication is included otherwise).

Even though the encryption engine 150, the support testing engine 152, and the object repository 154 are illustrated as stand-alone modules, the present disclosure may not be limited in this regard and the modules 150-154 may be part of (implemented within) the SUAE 140. Additionally, the SUAE 140 may be implemented in hardware and/or software, as a stand-alone application or as part of the server 130 and/or any of the devices 110 (e.g., as part of the operating system).

In practice, the systems shown herein, such as system 100 can vary in complexity, with additional functionality, more complex components, and the like.

The system 100 and any of the other systems described herein can be implemented in conjunction with any of the hardware components described herein, such as the computing systems described below (e.g., processing units, memory, and the like). In any of the examples herein, the inputs, outputs, and tools can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques without concern over the actual computing infrastructure needed or used to operate the servers, which can be administered by a business entity different from the client user.

FIG. 2 is a block diagram of a test suite configuration engine used by the software upgrade analysis engine of FIG. 1, in accordance with an example embodiment of the disclosure. Referring to FIG. 2, a user 201 may use the SUAE 140 in connection with performing software upgrade analysis. More specifically, FIG. 2 illustrates a more detailed diagram of the test suite configuration engine 142, which is used for defining the test suite used for software analysis and system validation.

The test suite configuration engine 142 may comprise repository content 202, which may include one or more repository objects (or object classes) 204. Example objects include objects 206, . . . , 212, which may be objects associated with specific enterprise data analytics/processing suites (e.g., a WebI object 206, an Explorer object 208, a Universe object 210, and a Lumira object 212). The API test suite 214 may be used to determine one or more operations that can be performed with a given object using the metadata dictionary 216. The metadata dictionary 216 may be a repository of operations (or API calls used to perform the operations) associated with one or more objects.

In operation, a user 201 may login to the SUAE 140 and into the repository 202. The repository objects 204 can be listed/presented to the user 201. Example objects include objects 206, . . . , 212. The user 201 may then select one or more of the repository objects 204 for validations. The user's object selection may be designated as 240. In an example embodiment, the user may also be presented one or more specific documents of the selected object type for validation. The document selection by the user may be indicated as 242. The object selection 240 (e.g., object 206) can be communicated to the API test suite 214 and the corresponding operation(s) (or API calls) for the selected object 206 may be retrieved from the metadata dictionary 216 (e.g., API call 218 corresponding to object 206) and may be displayed as available validation test cases for the repository objects chosen by the user.

Figure 5:
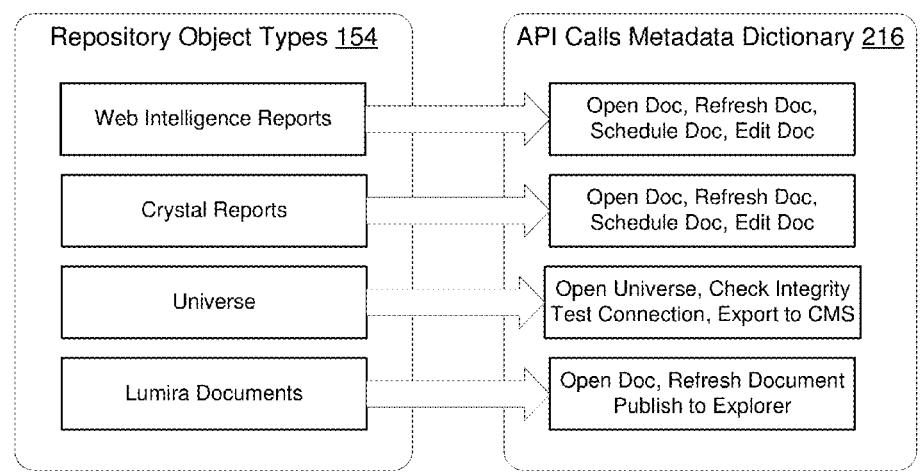
FIG. 5 illustrates example object types and corresponding operations that are available for execution with the object types using API calls.

FIG. 5 illustrates example object types and corresponding operations that are available for execution with the object types using API calls. For example, the object repository (154 in FIG. 1 or 202 in FIG. 2) may include the object classes/types 206, . . . , 212, as listed in FIG. 5. Corresponding operations available for each object class are listed within the dictionary 216. For example, Open, Refresh, Schedule, or Edit operations are available for documents of the WebI Reports object class. A test case may be generated for each of these operations (as illustrated in FIG. 4), where each operation may be executed by using a corresponding API call. The dictionary 216 may contain definitions of the operations, corresponding API calls to trigger the operations, as well as one or more arguments that can be used for executing the API calls for a corresponding operation.

After the test suite configuration engine 142 displays the available operations for a selected one or more object classes, the user 201 may select one or more of the available operations to run as test cases in subsequent tests for a software environment. The selection of the operation (or operations) to run as test cases may be recorded as test selection 244. The test selection 244 may include the operation (or operation type) 246 as well as one or more arguments 248 used for performing the operations 246.

In accordance with an example embodiment, the test suite configuration engine 142 may use one or more external support tools 226 for testing a software environment (or a document within a software environment). The support tools 226 may be read using a tools suite reader 228. The reader 228 may include a first external test suite reader 230 and a second external test suite reader 232. The readers 230-232 may be used to generate a test suite (or definition file) 234 associated with an external test (e.g., an external test provided by a third-party for purposes of testing a software environment during an upgrade). The test suite 234, if available and selected by the user, may be included as part of the test selection information 244. The object selection 240, the document selection 242 (if a document was selected), and the test selection 244 may be communicated to the test execution engine 144 for further processing.

Figure 3:
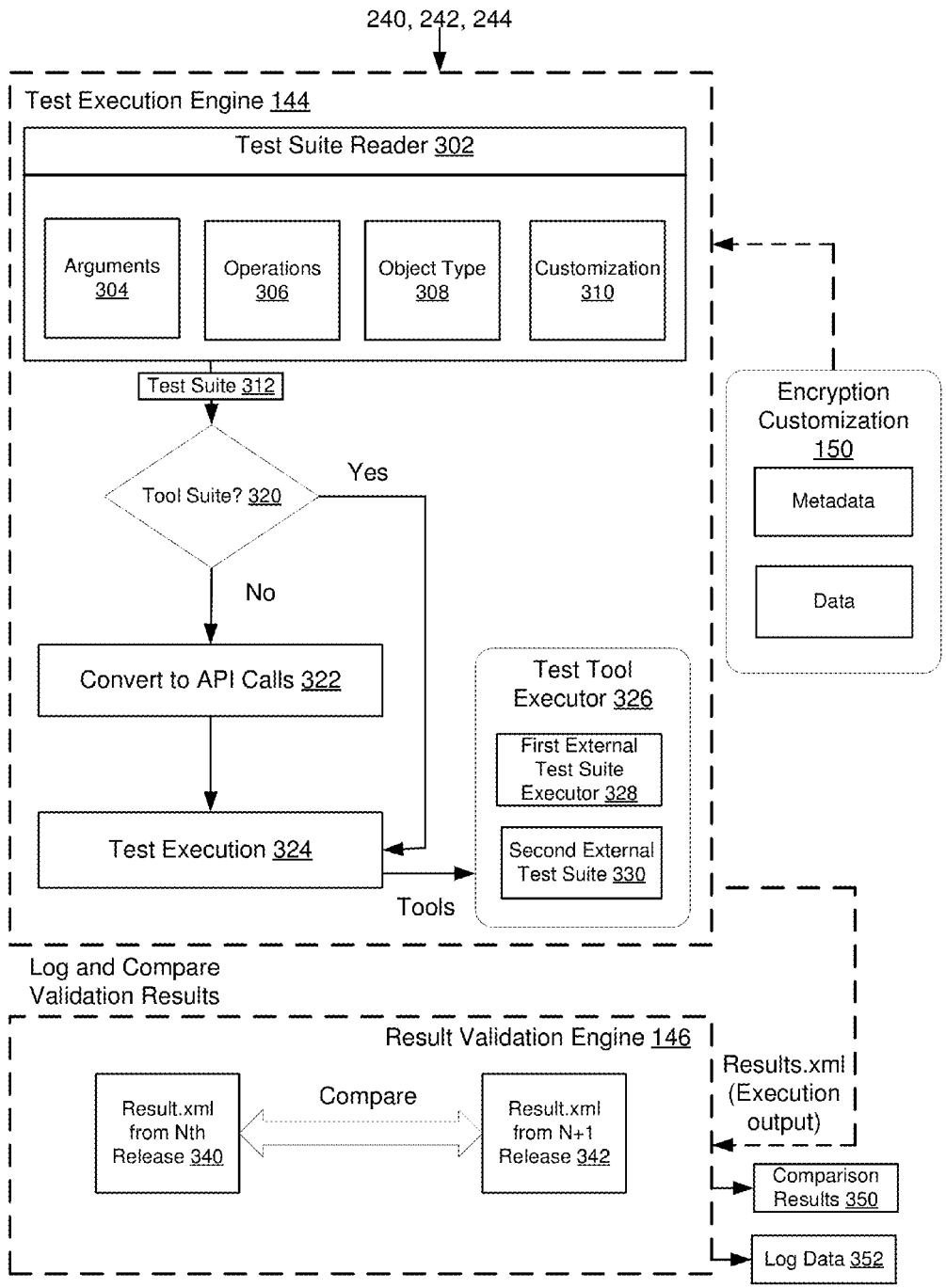
FIG. 3 is a block diagram of a test execution engine and a results validation engine used by the software upgrade analysis engine of FIG. 1, in accordance with an example embodiment of the disclosure.

FIG. 3 is a block diagram of a test execution engine and a results validation engine used by the software upgrade analysis engine of FIG. 1, in accordance with an example embodiment of the disclosure. Referring to FIG. 3, the test execution engine 144 may comprise a test suite reader 302, a conversion block 322 and test execution blocks 324-326.

The test suite reader 302 receives the object selection 240, the document selection 242 (if a document was selected), and the test selection 244, and generates a test suite 312 (e.g., a test suite definition file). More specifically, the test suite reader 302 may extract an object type 308, one or more operations 306 which have been selected for testing (e.g., a document of the object type), and one or more arguments 304 used to perform the operations 306. The extracted information 304-308 may be used to generate one or more test cases for inclusion into the test suite 312. Optionally, customization information 310 may also be included in the test suite 312. Example customization information 310 may include encryption customization to data or metadata performed by the encryption engine 150.

FIG. 4 illustrates example test suite definition structure, in accordance with an example embodiment of the disclosure. Referring to FIG. 4, a more detailed view of an example test suite definition file 312 is illustrated. As seen in FIG. 4, the test suite 312 may include a plurality of test cases 402-408. Each test case may include a name (with a test case ID, CUID), an object type (or artefact type), operation name (e.g., an operation selected from the dictionary 216) and one or more arguments used for executing the operation.

In operation, after the test suite 312 is generated, the test cases may be read from the suite 312 and the engine 144 may determine, at 320, whether an external/supplemental tool suite is used (e.g., 234). If an external suite is used, the external suite is communicated by the execution module 324 to the test tool executor 326. The test tool executor 326 may use one or more external/supplemental test executors (e.g., 328, 330) to execute the external test suite 234.

If at 320 it is determined that an external tool suite is not included in the test suite 312, then the test cases in the test suite 312 can be read and the operations in each test case can be converted (at 322) to API calls along with the corresponding arguments. The API calls can be executed by the test execution block 324. In an example embodiment, when new features are introduced in new software releases, test cases (as listed in the test suite 312) associated with operations for these features may be updated automatically. In this regard, the test suite 312 may be stored after it is initially generated, and may be automatically updated with new test cases (or existing test case operations and/or arguments may be updated).

After the test suite 312 is executed a results file (e.g., 340) is generated and communicated to the results validation engine 146. The results file 340 may be based on executing the test suite 312 at an initial state of a software environment (e.g., prior to upgrading). After the software environment is upgraded, the test suite 312 may be executed again and a new result 342 may be generated and communicated to the result validation engine 146. The format of the results log 340 may be selected by the user 201. For example, the user may choose to compare only metadata or data associated with executing the test suite 312. The user may also select to store the test results in plain text format or in encrypted format. The multiple test results (e.g., 340, 342) may be compared by the result validation engine 146. For example, the results 340 and 342 may each include a Pass or Fail indication for each of the operations/API calls for the test cases in the test suite 312. The engine 146 may compare the test results 340 and 342 on an API-by-API basis, where each API call result (for each test case) in one test is compared with a result from the same API call in the next test. Success (e.g., a Pass indication in a new test) against a previous failure (e.g., a Fail indication in a previous test) means that an issue is fixed in the new release. Conversely, a failure of a test case (e.g., a Fail indication in a new test) against a previous success (e.g., a Pass indication in a previous test) indicates that a regression has been introduced.

A final result of the comparison (e.g., 350) as well as log data 352 (e.g., error exceptions and so forth) may be output from the result validation engine 154.

Figure 6:
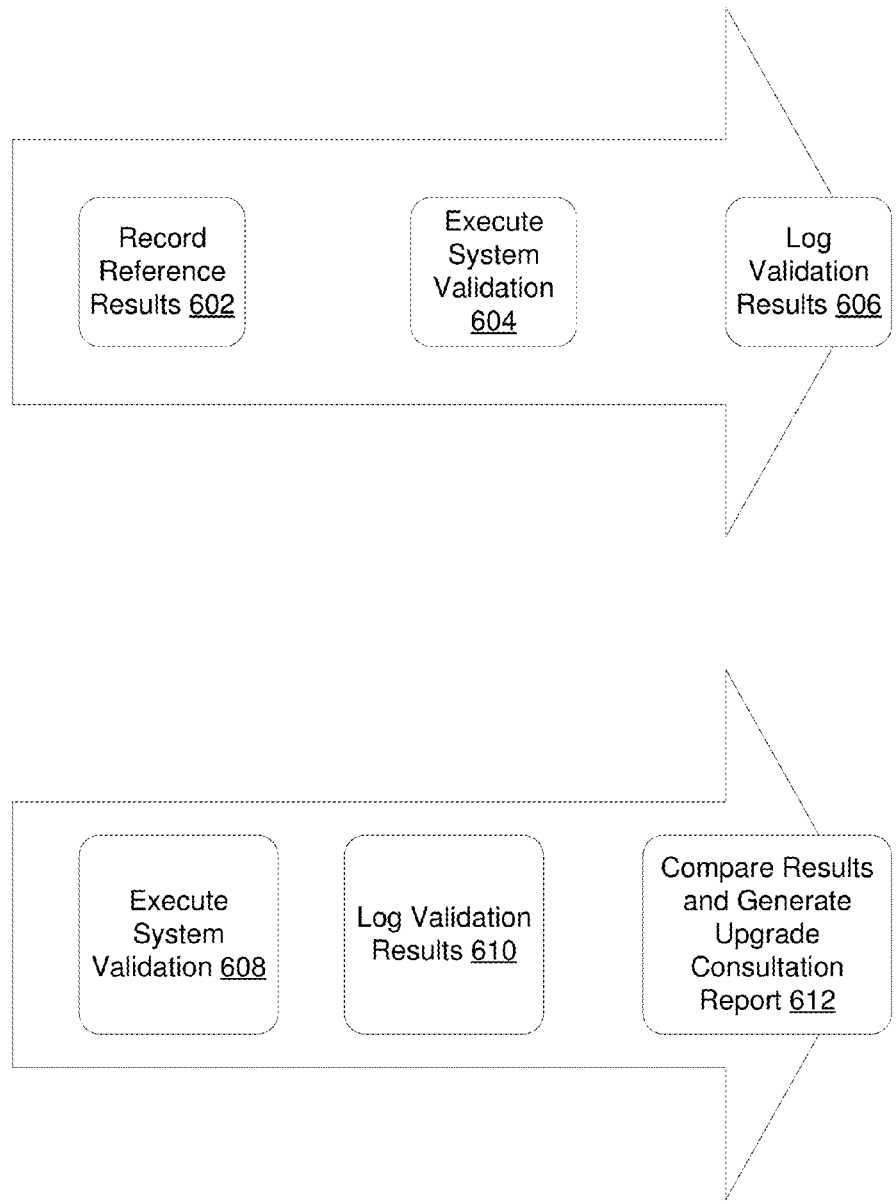
FIG. 6 is an example processing flow used with the software upgrade analysis engine of FIG. 1.

FIG. 6 is an example processing flow used with the software upgrade analysis engine of FIG. 1. Referring to FIG. 6, the example processing may start at 602, when the test suite configuration engine 142 may obtain/record the reference data used for generating the test suite 312. For example, the test suite configuration engine 142 may obtain the object selection 240, the document selection 242, and the test selection 244. At 604, the test execution engine 144 may generate the test suite 312 and may execute system validation (i.e., execute the API calls for each of the test cases within the test suite 312) prior to any software upgrade. Validation results may be logged at 606 (e.g., results 340 from the Nth software release may be logged/stored). At 608, after software has been upgraded (e.g., N+1 release), the test suite 312 can be executed again, and validation results (e.g., result 342) may be logged/stored. At 612, the result validation engine 342 may compare the results (e.g., 340 and 342) and generate an upgrade consultation report (e.g., comparison results 350 and/or log data 352) for output to the user 201.

Figure 7:
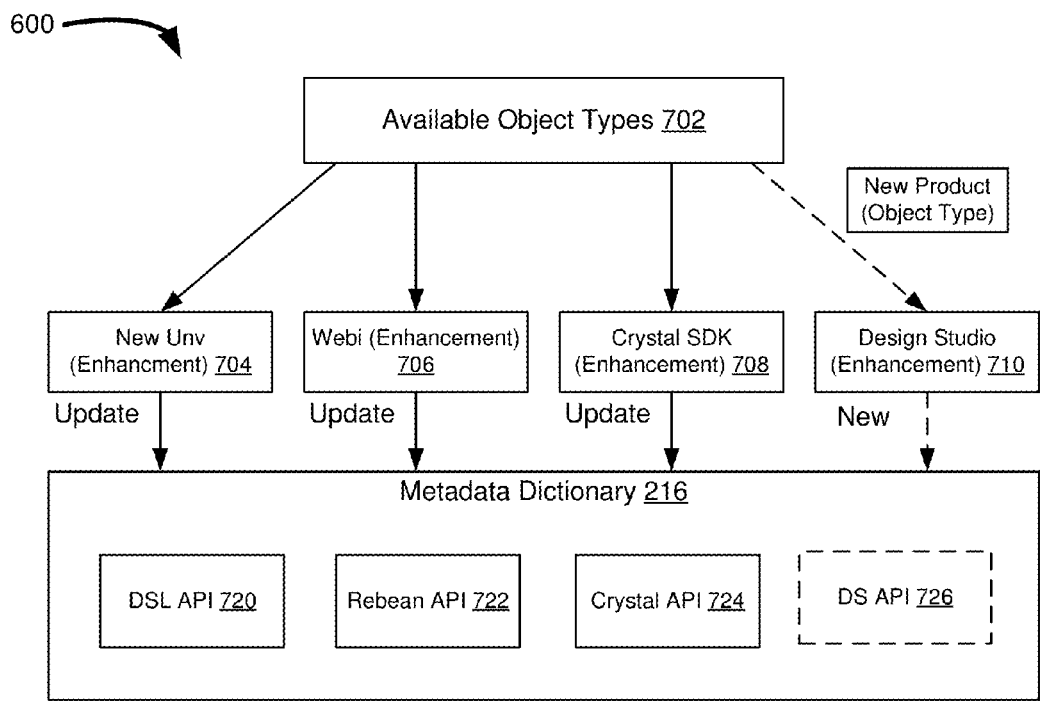
FIG. 7 is a block diagram of a metadata dictionary of APIs and updating the dictionary after a software upgrade, in accordance with an example embodiment of the disclosure.

FIG. 7 is a block diagram of a metadata dictionary of APIs and updating the dictionary after a software upgrade, in accordance with an example embodiment of the disclosure. Referring to FIG. 7, there is illustrated a repository of available object types 702, which may be the same as repository 202 of FIG. 2. As software updates are installed, one or more of the object classes/types within the repository 702 may be updated (e.g., object classes 704-708 are updated). The software update may also provide one or more new object classes, such as object class 710. Each of the updated (or new) object classes may also have a corresponding updated (or new) operation (or API call) within the metadata dictionary 216. For example, updated API calls 720-724 correspond to object classes 704-708, and a new API 726 corresponds to the new object class 710. Any existing operations (and API calls) associated with a test suite may be automatically updated after a software upgrade.

Figure 8:
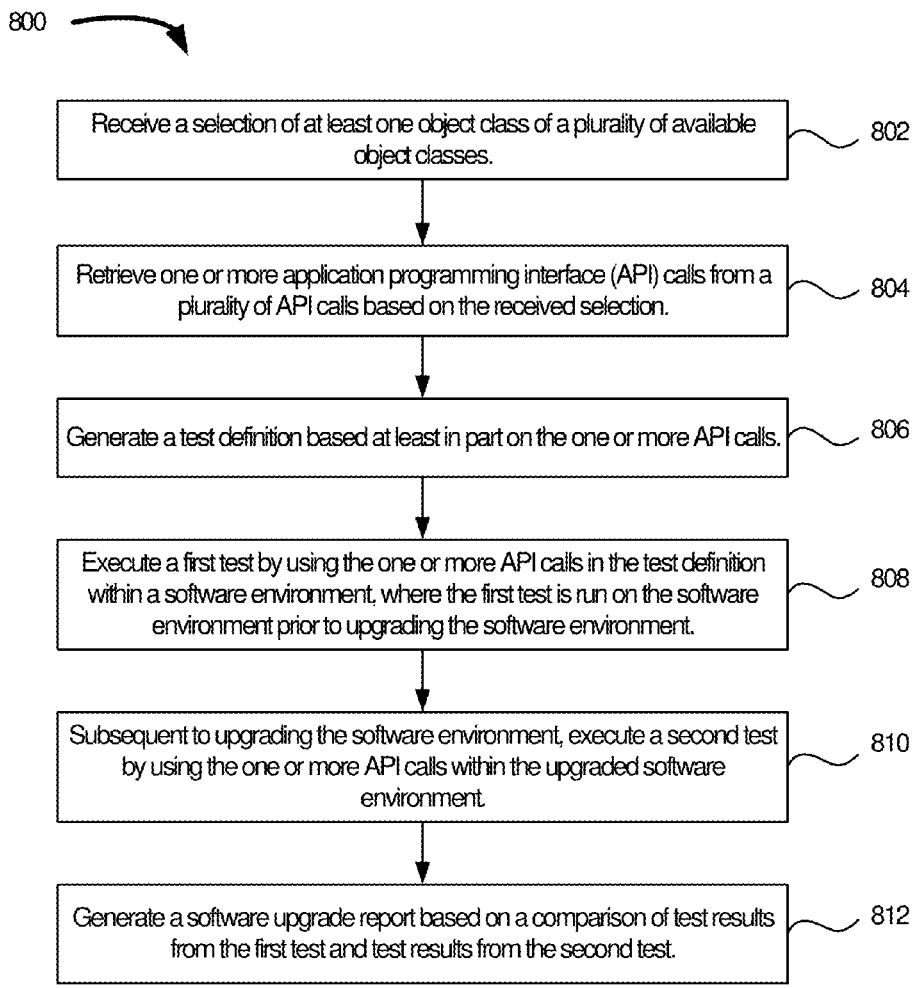
FIGS. 8-10 are flowcharts of example methods for software upgrade analysis, in accordance with an example embodiment of the disclosure.
Figure 9:
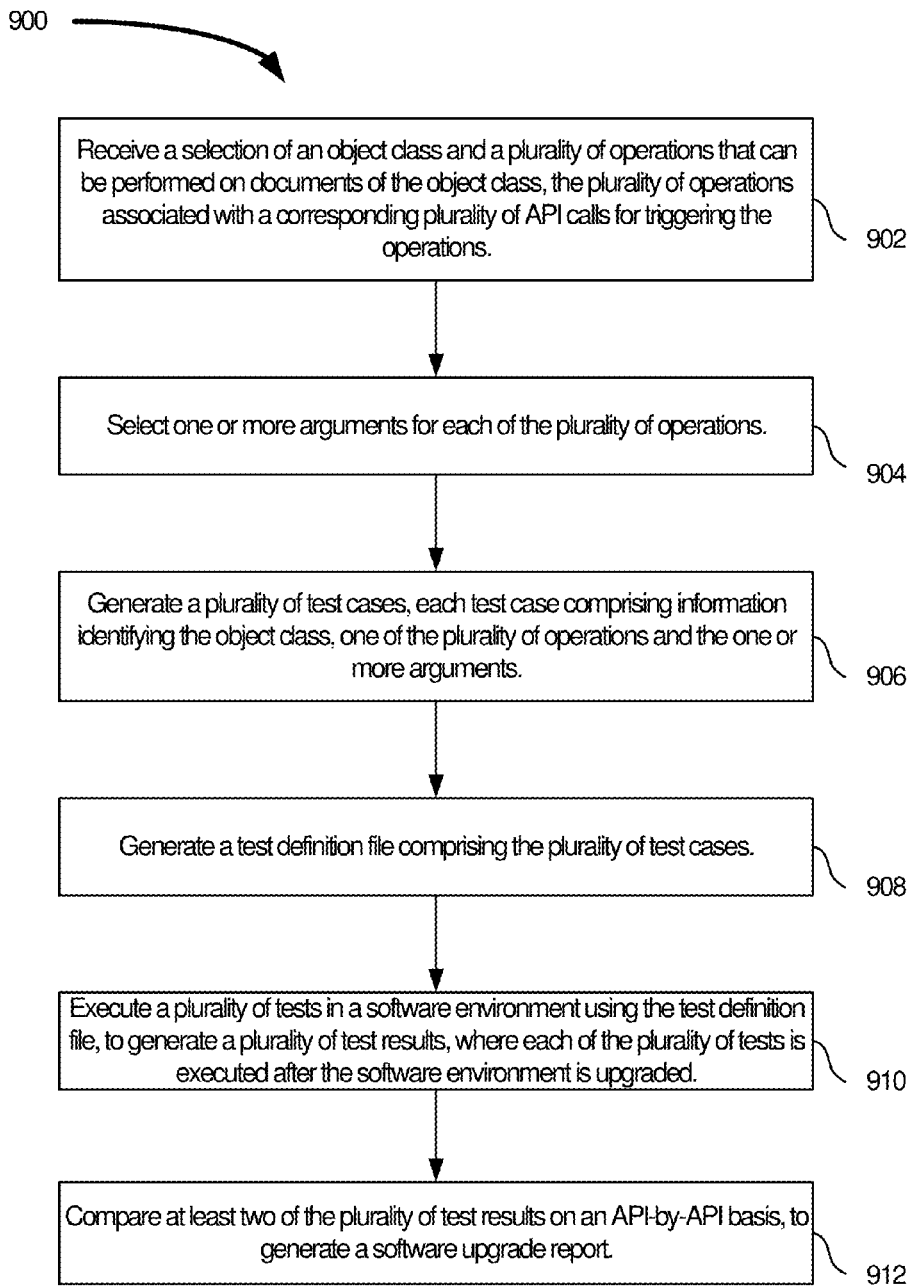
Figure 10:
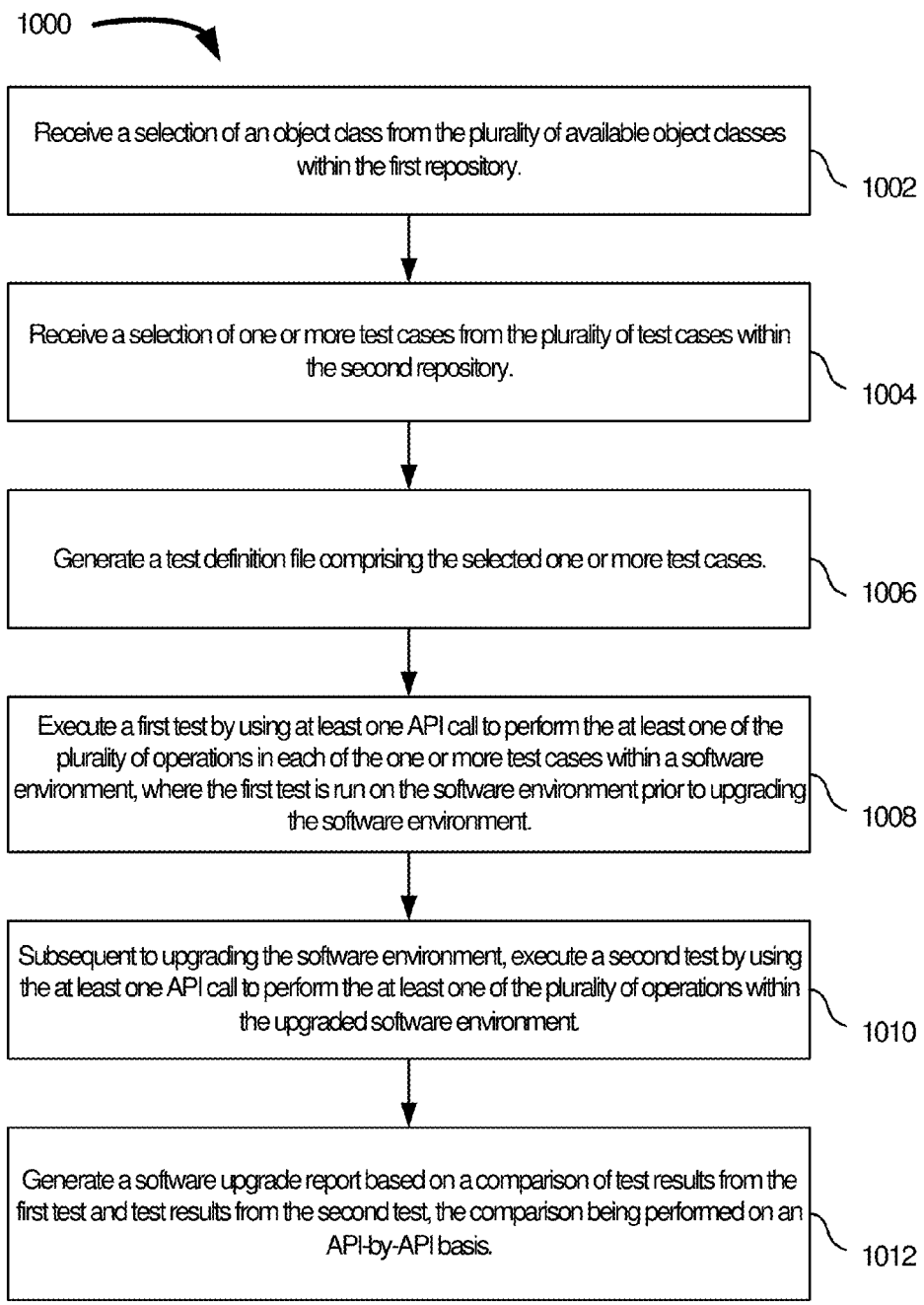

FIGS. 8-10 are flowcharts of example methods for software upgrade analysis, in accordance with an example embodiment of the disclosure. Referring to FIGS. 1-3 and 8, the example method 800 may start at 802, when a selection (e.g., 240) of at least one object class of a plurality of available object classes may be received (e.g., one or more of the object classes 206, . . . , 212 may be selected by the user 201 using the test suite configuration engine 142). At 804, one or more application programming interface (API) calls may be retrieved from a plurality of API calls based on the received selection (e.g., the engine 142 may retrieve operations and/or API calls from the metadata dictionary 216, based on the selected one or more object classes). At 806, a test definition is generated based at least in part on the one or more API calls (e.g., the test execution engine 144 generates the test suite 312 based on one or more of the object type 308, operations 306 and/or arguments 304 received from engine 142). At 808, a first test is executed by using the one or more API calls in the test definition within a software environment (e.g., the test execution module 324 executes the corresponding API calls for each test case within the test suite 312). The first test is run on the software environment prior to upgrading the software environment. At 810, subsequent to upgrading the software environment, the test execution module 324 may execute a second test by using the one or more API calls of the same test suite 312 within the upgraded software environment. At 812, a software upgrade report (e.g., 350) is generated based on a comparison of test results from the first test (340) and test results from the second test (342).

Referring to FIGS. 1-3 and 9, the example method 900 may start at 902, when a selection of an object class and a plurality of operations that can be performed on documents of the object class can be received (e.g., one or more of the object classes 206, . . . , 212 and operations 246 for each object class may be selected by the user 201 using the test suite configuration engine 142). The plurality of operations are associated with a corresponding plurality of API calls for triggering the operations. At 904, one or more arguments (304) may be selected for each of the plurality of operations (246). For example, the dictionary 216 may also include arguments for each operation, which may be automatically selected after an operation is selected for inclusion in a test case. At 906, a plurality of test cases are generated (e.g., by the reader 302). Each test case (e.g., 402, . . . , 408) may include information identifying the object class, one of the plurality of operations and the one or more arguments. At 908, a test definition file (e.g., 312) that includes the plurality of test cases may be generated (e.g., by the reader 302). At 910, a plurality of tests may be executed in a software environment using the test definition file (312), to generate a plurality of test results (e.g., 340-342). At least one of the plurality of tests (e.g., test associated with the N+1 release and results 342) is executed after the software environment is upgraded. At 912, at least two of the plurality of test results may be compared (e.g., 340-342 can be compared by engine 146) on an API-by-API basis, to generate a software upgrade report (e.g., 350).

Referring to FIGS. 1-3 and 10, the example method 1000 may start at 1002, when a selection of an object class may be received from a plurality of available object classes within a first repository (e.g., one or more of the object classes 206, . . . , 212 may be selected by the user 201 using the test suite configuration engine 142 and the repository 202). At 1004, a selection of one or more test cases from the plurality of test cases within the second repository may be received. For example, the metadata dictionary 214 may be a repository that includes available operations that can be performed on one or more object classes, corresponding API calls, and/or test cases (e.g., such as test cases 402-408) associated with such operations. After a user selects an operation, a corresponding API call or a test case can be selected for inclusion into the test suite 312.

At 1006, a test definition file (e.g., 312) that includes the selected one or more test cases may be generated. At 1008, a first test can be executed by using at least one API call to perform the at least one of the plurality of operations in each of the one or more test cases within a software environment (e.g., a first execution of the test suite 312 in the software environment prior to an upgrade). At 1010, subsequent to upgrading the software environment, a second test can be executed by using the at least one API call to perform the at least one of the plurality of operations (as specified by the test cases in the test suite 312) within the upgraded software environment (e.g., the second execution of the test suite 312 to obtain result 342). At 1012, a software upgrade report (e.g., 350) is generated based on a comparison of test results from the first test (340) and test results from the second test (342), the comparison being performed on an API-by-API basis.

Figure 11:
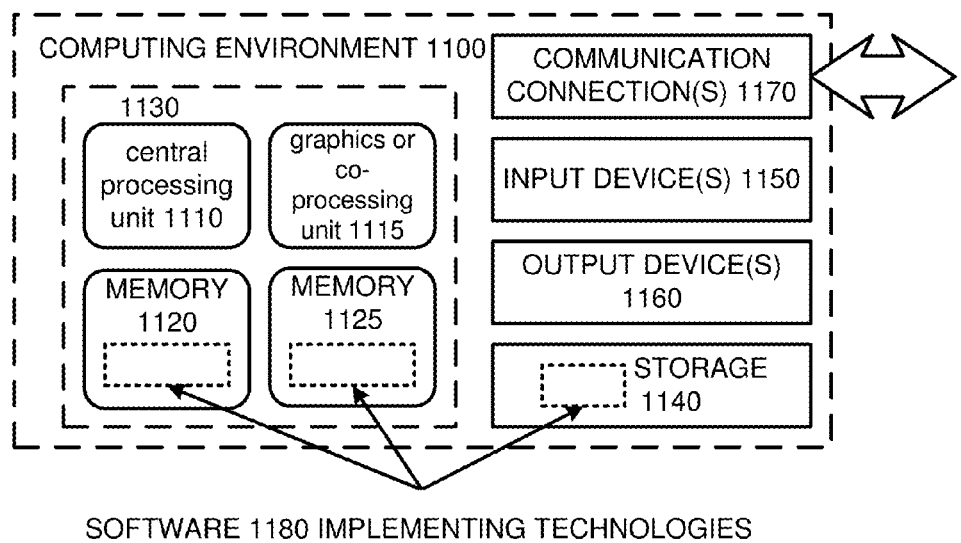
FIG. 11 is a diagram of an example computing system, in which described embodiments can be implemented.

FIG. 11 is a diagram of an example computing system, in which described embodiments can be implemented. The computing system 1100 is not intended to suggest any limitation as to scope of use or functionality, as the innovations may be implemented in diverse general-purpose or special-purpose computing systems. With reference to FIG. 11, the computing system 1100 includes one or more processing units 1110, 1115 and memory 1120, 1125 (e.g., coupled to the processing units). In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. For video encoding, the input device(s) 1150 may be a camera, video card, TV tuner card, or similar device that accepts video input in analog or digital form, or a CD-ROM or CD-RW that reads video samples into the computing system 1100. The output device (s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 12:
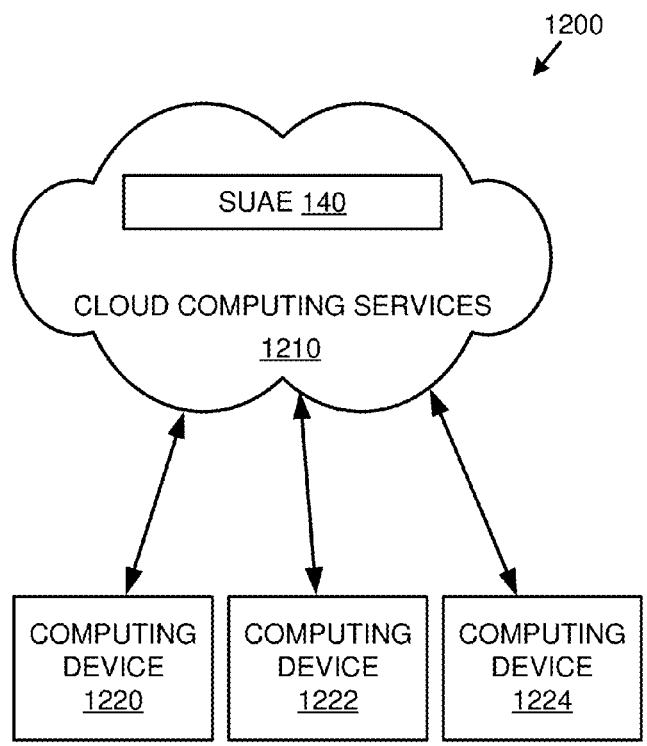
FIG. 12 is an example cloud computing environment that can be used in conjunction with the technologies described herein.

FIG. 12 is an example cloud computing environment 1200 that can be used in conjunction with the technologies described herein. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries). Additionally, the cloud computing service 1210 may implement the SUAE 140 and other functionalities described herein relating to software upgrade analysis.

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)). By way of example and with reference to FIG. 11, computer-readable storage media include memory 1120 and 1125, and storage 1140. The term computer-readable storage media does not include communication connections (e.g., 1170) such as modulated data signals or carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a computing device, for software upgrade analysis, the method comprising:

by the computing device:

receiving a request to generate a test definition, the request comprising a selection of at least one object class of a plurality of available object classes;

retrieving one or more application programming interface (API) calls from a plurality of API calls defined for the selected at least one object class, the one or more API calls being associated with one or more arguments;

generating the test definition for the selected at least one object class, the test definition comprising the one or more API calls and at least one value for at least one argument of the one or more arguments;

receiving an instance of the selected at least one object class;

executing a first test on the instance of the selected at least one object class using the at least one value of the at least one argument by automatically calling the one or more API calls in the test definition within a software environment wherein the first test is run on the software environment prior to upgrading the software environment;

subsequent to upgrading the software environment, executing a second test on the instance of the selected at least one object class using the at least one value of the at least one argument by automatically calling the one or more API calls within the upgraded software environment;

comparing, for each of the one or more API calls associated with the test definition, the test results from the first test with the test results from the second test, wherein the comparing is done on an API-by-API basis; and generating a software upgrade report based on a comparison of test results from the first test and test results from the second test.

2. The method according to claim 1, further comprising:
receiving a selection of one or more documents associated with the at least one object class.

3. The method according to claim 2, further comprising:
receiving a selection of one or more operations from a plurality of available operations that can be applied to the selected one or more documents.

4. The method according to claim 3, further comprising:
executing the one or more API calls during the first test and the second test to perform the one or more operations.

5. The method according to claim 3, further comprising:
generating a plurality of test cases, each test case identifying at least one of the plurality of object classes, at least one of the one or more API calls, and at least one argument used for performing the one or more operations associated with the at least one of the one or more API calls.

6. The method according to claim 5, wherein the test definition is a test definition file comprising the plurality of test cases.

7. The method according to claim 1, wherein the software upgrade report comprises a pass/fail indication for each comparison of the test results from the first test with the test results from the second test.

8. The method according to claim 7, further comprising:
detecting at least one exception during execution of the second test; and
updating the software upgrade report with information identifying the at least one exception.

9. A computer-readable storage medium storing computer-executable instructions thereon for software upgrade analysis, the method comprising:
receiving a selection of an object class and a plurality of operations defined for documents of the object class, the plurality of operations associated with a corresponding plurality of API calls for triggering the operations, at least one of the plurality of operations taking at least one argument;
defining one or more argument values for the at least one operation;
generating a plurality of test cases, each test case comprising information identifying the object class, the at least one operation and the one or more argument values defined for the at least one operation;
generating a test definition file comprising the plurality of test cases;
receiving an instance of the selected object class;
executing a plurality of tests on the instance of the selected object class using the one or more argument values in a software environment using the test definition file, to generate a plurality of test results the executing comprising, executing a first test of the plurality of tests in the software environment, prior to performing an upgrade of the software environment, the executing the first test comprising performing, for each test case in the test definition file, the one of the plurality of operations by executing a corresponding one of the plurality of API calls associated with the one of the plurality of operations within the software environment prior to performing the upgrade;

generating a first test result of the plurality of test results based on the executing the first test executing a second test of the plurality of tests in the software environment after performing the upgrade of the software environment, the executing the second test comprising performing, for each test case in the test definition file, the one of the plurality of operations by executing the corresponding one of the plurality of API calls associated with the one of the plurality of operations within the upgraded software environment; and generating a second test result of the plurality of test results based on the executing the second test; and comparing at least two of the plurality of test results on an operation-by-operation basis to generate a software upgrade report.

10. The computer-readable storage medium of claim 9, further including:
receiving a selection of one or more documents associated with the selected object class.

11. The computer-readable storage medium of claim 10, further including:
displaying a list of available operations that can be performed on the one or more documents; and
receiving the selection of the plurality of operations from the list of available operations.

12. The computer-readable storage medium of claim 9, further including:
comparing the first test result with the second test result by comparing results from executing the corresponding one of the plurality of API calls for each test case of the plurality of test cases in the test definition file, to generate the software upgrade report.

13. The computer-readable storage medium of claim 12, wherein the software upgrade report comprises a pass/fail indication for each of the plurality of test cases in the test definition file.

14. A computing device, comprising:
a first repository storing a plurality of available object classes;
a second repository storing a plurality of test cases, each test case comprising at least one of a plurality of operations available for performing on a document associated with at least one of the plurality of object classes, at least one of the plurality of operations taking at least one argument;
a memory; and
a processor coupled to the first repository, the second repository, and the memory, the processor being adapted to perform a method for software upgrade analysis, the method comprising:
receiving a selection of an object class from the plurality of available object classes within the first repository;

receiving a selection of one or more test cases from the plurality of test cases within the second repository;

receiving a document of the selected object class;

receiving a value for the at least one argument;

executing a first test on the instance of the selected object class using the at least one argument value by using at least one API call to perform the at least one of the plurality of operations in each of the one or more test cases within a software environment, wherein the first test is run on the software environment prior to upgrading the software environment;

subsequent to upgrading the software environment, executing a second test on the instance of the selected object class using the at least one argument value by using the at least one API call to perform the at least one of the plurality of operations within the upgraded software environment; and generating a software upgrade report based on a comparison of test results from the first test and test results from the second test, the comparison being performed on an API-by-API basis.

15. The computing device of claim 14, the processor further operable to:

receiving a selection of at least one external test suite; and including the at least one external test suite in the test definition file.

16. The computing device of claim 14, the processor further operable to:

detecting at least one new operation that is available in the software environment after the upgrading;

generating a new test case associated with the at least one new operation; and storing the new test case in the second repository.

* * * * *